UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

PAINT OR VARNISH REMOVER.

1,113,972. Specification of Letters Patent. Patented Oct. 20, 1914.

No Drawing. Application filed March 22, 1912. Serial No. 685,610.

*To all whom it may concern:*

Be it known that I, CARLETON ELLIS, a citizen of the United States, and resident of Montclair, in the county of Essex and State of New Jersey, have made certain new and useful Inventions Relating to Paint or Varnish Removers, of which the following is a specification.

This invention relates to paint or varnish removers and relates especially to removers comprising waxy or other equivalent film-forming ingredients, volatile solvents and fatty acid material adapted to make a readily emulsifiable composition after the remover has acted on the finish.

Suitable saponifiable material, such as oleic, palmitic, stearic and other soap-forming acid material may be readily incorporated in paint or varnish removers and promote the smoothness and consistency of the remover so as to make it more desirable for application to vertical and inclined surfaces. In addition the incorporated saponifiable material is quite readily acted on by soap and water or similar detergents, the fatty acid material being attacked and saponified, thus effectually breaking up the material remaining on the treated surface so that its complete removal is facilitated.

Loosening finish solvent material, that is solvents of a generally alcoholic character or action in removers may of course be used in such removers, such as methyl, ethyl, propyl, butyl and allyl alcohols, preferably in their cheap commercial forms, including denatured alcohol and other ketonic loosening solvents such as methyl acetone, acetone and other ketones, acetone oil and so forth. Suitable penetrating finish solvent material, that is solvents having a generally benzolic character or action in removers may also be used, including benzol, toluol and their homologues, as well as benzin, gasolene and other petroleum products which may be used in considerable proportions and also carbon-bisulfid, carbon-tetrachlorid and other chlorinated compounds, such as acetylene chlorid or tetrachlorethane. Suitable stiffening material is preferably used in these removers, such as wood flour, starch, whiting, infusorial earth and various waxy or soapy materials, such as paraffin or ceresin, beeswax and pyroxylin which form effective evaporation retarding films on the exposed surface of the remover. The various ingredients are preferably combined by agitation at a suitable slight increase of temperature, the waxy or soapy stiffening material, as well as the saponifiable fatty acid material being preferably first dissolved in more energetic solvents therefor, although this is not, of course, necessary in all cases.

A suitable illustrative remover of this character may comprise benzol 45 parts, wood alcohol 50 parts, paraffin 2 parts, and palmitic acid 3 parts. Another illustrative remover may comprise benzol 25 parts, benzin 20 parts, acetone 47 parts, ceresin 3 parts, and oleic acid 5 parts.

Having described the invention in this case which contains subject-matter taken from my copending application Serial No. 376,388, filed May 29, 1907, patented Jan. 7, 1913, No. 1,049,467 in connection with a number of illustrative ingredients, proportions and formulas, to the details of which disclosure the invention is not of course to be limited, what is claimed is:

1. The finish remover comprising approximately benzol 25 parts, benzin 20 parts, acetone 47 parts, ceresin 3 parts and oleic acid 5 parts.

2. The finish remover comprising approximately benzol 25 parts, benzin 20 parts, loosening finish solvent material 47 parts, mineral wax 3 parts and oleic acid 5 parts.

3. The finish remover comprising approximately benzol 25 parts, benzin 20 parts, loosening finish solvent material 47 parts, mineral wax 3 parts, and saponifiable fatty acid material 5 parts.

CARLETON ELLIS.

Witnesses:
JESSIE B. KAY,
JAMES N. CARLON.